W. G. HURST.
BRAKE.
APPLICATION FILED OCT. 10, 1917.
1,274,885.
Patented Aug. 6, 1918.
2 SHEETS—SHEET 1.
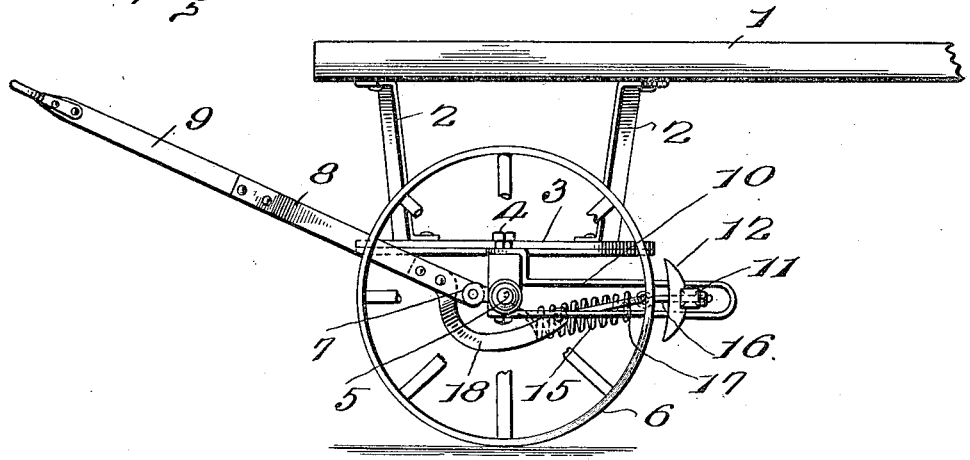
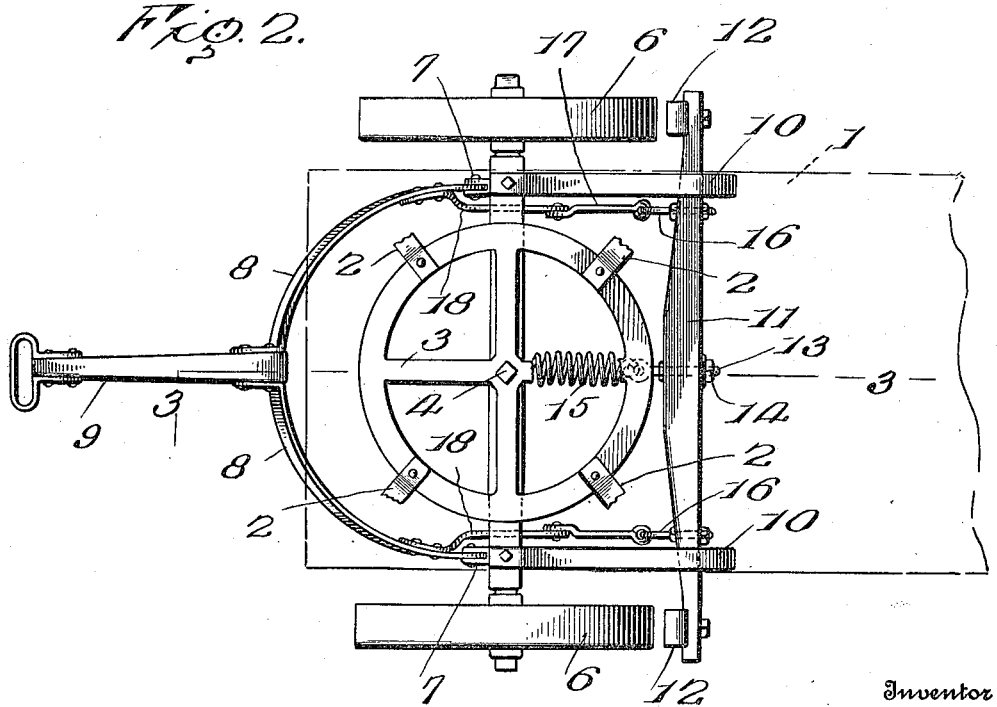
Inventor
W. G. Hurst.
By
Han Macey, Attorneys W. G. HURST.
BRAKE.
APPLICATION FILED OCT. 10, 1917.
1,274,885.
Patented Aug. 6, 1918.
2 SHEETS—SHEET 2.
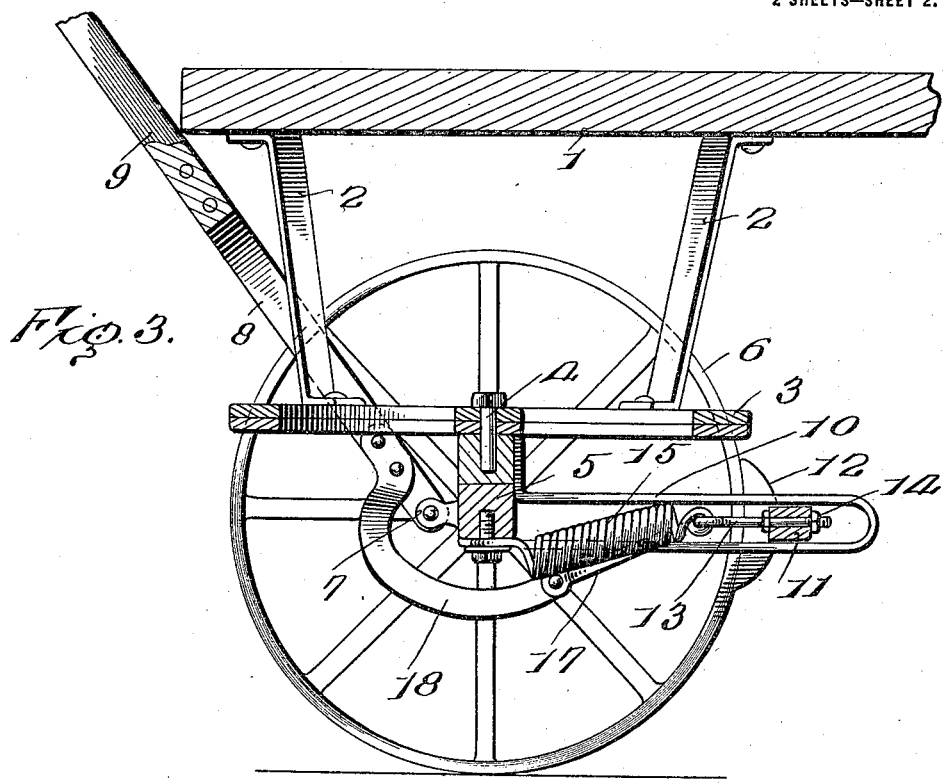
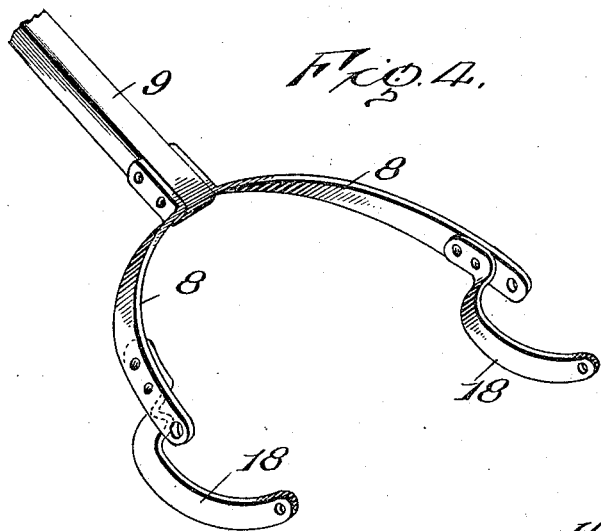
Inventor
W. G. Hurst.
By
_____, Attorneys

UNITED STATES PATENT OFFICE.

WOODFORD G. HURST, OF OXFORD, KANSAS.

BRAKE.

1,274,885.　　　　Specification of Letters Patent.　　Patented Aug. 6, 1918.

Application filed October 10, 1917. Serial No. 195,811.

*To all whom it may concern:*

Be it known that I, WOODFORD G. HURST, a citizen of the United States, residing at Oxford, in the county of Sumner and State of Kansas, have invented certain new and useful Improvements in Brakes, of which the following is a specification.

My invention is a brake for baggage trucks and has for its object the provision of means whereby when the truck is at rest, the brakes will be applied and the handle or tongue will be held up out of the way of passers-by. The invention seeks to provide a device which may be readily applied to the front wheels of a four-wheeled baggage truck and in which the parts will be so constructed and arranged that when the handle is in an operative position, the brakes will be free and the truck may be either pulled or pushed without applying the brakes but, upon release of the handle, the brakes will be automatically and instantly applied.

The invention is illustrated in the accompanying drawings and consists in certain novel features which will be particularly pointed out in the claims following a detailed description.

In the drawings:

Figure 1 is a side elevation of the forward end of a baggage truck with parts broken away;

Fig. 2 is a plan view of the same;

Fig. 3 is an enlarged detail section on the line 3—3 of Fig. 2;

Fig. 4 is a detail perspective view of the hounds attached to the handle or tongue and the levers carried by said hounds.

The truck comprises a bed or floor 1 which is supported by brackets or standards 2 upon a fifth wheel 3, the fifth wheel being connected by a king bolt 4 to the front axle 5. Wheels 6 are mounted upon the ends of the axle and upon the front side of the axle are secured lugs or ears 7 to which are pivoted the ends of hounds 8 which are secured to and diverge from the lower or rear end of the handle or tongue 9.

Secured to the axle, near the ends of the same, are rearwardly extending arms 10 which form guides and supports for a brake beam 11 which extends parallel with the axle and is equipped at its ends with brake shoes 12 adapted to bear upon the wheels 6. These guiding and supporting arms are preferably in the form of straps doubled upon themselves and having their ends secured respectively to the top and bottom of the axle, as will be readily understood on reference to Fig. 3. In the brake beam, at the center of the same, is fitted an eye bolt 13 having a nut 14 mounted upon its rear end which is adapted to be turned home against the rear side of the brake beam and thereby determine the extent to which the eye bolt will project through the beam. A spring 15 has one end engaged in the eye of this bolt 13 and its opposite end secured to the axle so that the tension of the spring serves to pull the brake beam forward and will normally hold the shoes 12 against the wheels. It will be readily understood that by properly setting the nut 14, the tension of the spring may be regulated. Other eye bolts 16 are secured in the brake beam, near the ends thereof, and these eye bolts are connected by links 17 with the rear ends of the arms 18 which have their front ends secured to the hounds 8 and extend rearwardly and downwardly from the hounds so as to pass under the axle, as clearly shown in Figs. 1 and 3.

The operation of the device is thought to be evident. When the handle or tongue 9 is swung down to the operating position shown in Fig. 1, the arms 18 are swung rearwardly so that a push is exerted through the links 17 and the eye bolts 16 to move the brake beam and the brake shoes rearwardly from the wheels. This movement of the brake beam, of course, puts the spring 13 under tension so that the instant the handle is released, the spring will exert a pull upon the brake device and draw the same forward to apply the brake shoes to the wheels and this forward movement of the brake beam is necessarily transmitted directly through the eye bolts 16 and links 17 to the arms 18 so that the handle or tongue will be swung up to the position shown in Fig. 3.

My improved device is composed of very few parts which are of simple construction and arrangement. The device can be applied to a truck in a very few minutes and when applied will effectually prevent movement of the truck when the same is left unattended and will also throw the tongue or handle up out of the way so that it will not be permitted to lie upon the ground or floor of a room or platform where it will be liable to injure passers-by. The parts are so arranged that they do not interfere in any manner with the ordinary use of the truck nor with the movement of any of the parts.

Having thus described the invention, what is claimed as new is:

1. In an apparatus for the purpose set forth, the combination of an axle, a wheel mounted thereon, a guiding and supporting arm secured to and projecting rearwardly from the axle, a tongue pivotally attached to the front of the axle, a brake beam slidably mounted on said guiding and supporting arm, a brake shoe mounted on the beam and arranged to engage the wheel, a coil spring connected at one end with the axle and at its opposite end with the brake beam, an arm carried by the tongue and extending downwardly under the axle, and a link connecting said arm with the brake beam.

2. In an apparatus for the purpose set forth, the combination with an axle, and wheels mounted thereon, of a tongue pivotally attached to the front side of the axle, supports secured to and projecting horizontally rearward from the axle, a brake beam slidably mounted on said supports and projecting beyond the same, brake shoes carried by the ends of the brake beam in position to engage the wheels, a contractile spring secured to the axle and disposed in rear of the same, an adjustable connection between said spring and the brake beam, arms depending from the tongue and extending rearwardly under the axle, links pivotally attached to the rear ends of said arms, and adjustable connections between the said links and the brake beam.

In testimony whereof I affix my signature.

WOODFORD G. HURST. [L. S.]

Copies of this patent may be obtained for five cents each, by addressing the "Commissioner of Patents, Washington, D. C."